United States Patent
Nakatsuji et al.

(10) Patent No.: US 7,794,679 B2
(45) Date of Patent: Sep. 14, 2010

(54) CATALYST AND METHOD FOR PURIFICATION OF DIESEL ENGINE EXHAUST GAS

(75) Inventors: Tadao Nakatsuji, Okayama (JP); Naoki Oya, Okayama (JP); Naohiro Sato, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 140 days.

(21) Appl. No.: 12/008,609

(22) Filed: Jan. 11, 2008

(65) Prior Publication Data

US 2008/0196399 A1  Aug. 21, 2008

(30) Foreign Application Priority Data

Jan. 12, 2007  (JP) ............... 2007-004950

(51) Int. Cl.
*B01D 53/56* (2006.01)
*B01D 53/94* (2006.01)
*B01J 29/00* (2006.01)

(52) U.S. Cl. ............. 423/213.2; 423/239.2; 423/700; 423/714; 502/60; 502/61; 502/65; 502/66; 502/73; 502/74; 502/325; 502/344; 502/340; 60/299; 60/301

(58) Field of Classification Search .......... 423/700, 423/714, 213.2, 239.2; 502/60, 61, 65, 66, 502/73, 74, 325, 344, 340; 60/299, 301
See application file for complete search history.

(56) References Cited

U.S. PATENT DOCUMENTS

| | | | | |
|---|---|---|---|---|
| 4,765,808 | A * | 8/1988 | Oigo et al. ............... 95/140 |
| 5,343,702 | A * | 9/1994 | Miyajima et al. ......... 60/285 |
| 5,900,222 | A * | 5/1999 | Ito et al. ............... 423/239.2 |
| 6,534,439 | B2* | 3/2003 | van den Tillaart et al. ... 502/326 |
| 6,569,394 | B2* | 5/2003 | Fischer et al. ........... 423/239.2 |
| 6,624,113 | B2* | 9/2003 | Labarge et al. ........... 502/344 |
| 7,078,004 | B2* | 7/2006 | Voss et al. ............... 423/213.5 |
| 7,527,776 | B2* | 5/2009 | Golden et al. ........... 423/239.1 |
| 2002/0004446 | A1* | 1/2002 | Fischer et al. ........... 502/73 |
| 2002/0034466 | A1* | 3/2002 | Konig et al. ............. 423/212 |
| 2002/0053202 | A1* | 5/2002 | Akama et al. ........... 60/297 |
| 2002/0114751 | A1* | 8/2002 | Puppe et al. ............ 423/213.2 |
| 2005/0101473 | A1* | 5/2005 | Marshall et al. ......... 502/60 |

FOREIGN PATENT DOCUMENTS

| | | | |
|---|---|---|---|
| DE | 42 26 112 A1 | * | 2/1994 |
| JP | 1-318715 | | 12/1989 |
| JP | 04-118030 | * | 4/1992 |
| JP | 8-217565 | | 8/1996 |
| JP | 8-312334 | | 11/1996 |
| JP | 9-94434 | | 4/1997 |
| JP | 2001-269585 | | 10/2001 |
| JP | 2002-4838 | | 1/2002 |
| JP | 2002-58924 | | 2/2002 |
| JP | 2003-239722 | | 8/2003 |
| JP | 2006-289175 | | 10/2006 |
| WO | WO-02/096827 A1 | | 12/2002 |

OTHER PUBLICATIONS

Long, Xiang-Li et al., "Simultaneous removal of NO and $SO_2$ with hexamminecobalt(II) solution coupled with the hexamminecobalt(II) regeneration catalyzed by activated carbon," *Applied Catalysis B: Environmental*, vol. 54:25-32 (2004).

Setiabudi, Agus et al., "The role of $NO_2$ and $O_2$ in the accelerated combustion of soot in diesel exhaust gases," *Applied Catalysis B: Environmental*, vol. 50:185-194 (2004).

* cited by examiner

*Primary Examiner*—Timothy C Vanoy
(74) *Attorney, Agent, or Firm*—Lahive & Cockfield, LLP; Anthony A. Laurentano, Esq.

(57) ABSTRACT

The invention provides a catalyst for catalytically reducing nitrogen oxides in diesel engine exhaust gas by use of unburnt carbon contained in the diesel engine exhaust gas as a reducing agent, the catalyst comprising:
(a) an acid zeolite, or
(b) an alkali metal- and/or alkaline earth metal-containing zeolite, or
(c) a rare earth metal-containing zeolite, or
(d) a zeolite containing at least one transition metal selected from Fe, Co, Ni and Cu.

6 Claims, No Drawings

CATALYST AND METHOD FOR PURIFICATION OF DIESEL ENGINE EXHAUST GAS

TECHNICAL FIELD

The present invention relates to a catalyst which is to be supported on a diesel particulate filter (DPF) and which is used not only for catalytically reducing nitrogen oxides, which are mainly comprised of NO and $NO_2$ and are hereinafter referred to as $NO_x$, contained in diesel engine exhaust gas, using as a reducing agent unburnt carbon contained in the diesel engine exhaust gas and captured by the DPF, in a wide temperature range even in the presence of sulfur oxides; at the same time for catalytically oxidizing the unburnt carbon to remove it. The invention also relates to a method for catalytically reducing $NO_x$ using unburnt carbon as a reducing agent and catalytically oxidizing the unburnt carbon to remove it in such a manner as mentioned above.

BACKGROUND ART

Exhaust gas emitted from diesel engines contains $NO_x$, and particulate matter, so-called particulates (PM), such as oily particulate matter, carbonaceous particulate matter and sulfuric acid mist, and moreover, hydrocarbons, carbon monoxide, etc. Various methods for purification of such diesel engine exhaust gas by removing those components therefrom have been proposed.

Conventionally, carbonaceous PM contained in diesel engine exhaust gas, i.e., unburnt carbon, is captured by a DPF, thereby being removed from the exhaust gas. As disclosed in JP-A 09-094434 and JP-A 2001-269585, a DPF is normally a honeycomb structure which is made of silicon carbide, cordierite or the like and which has many through-holes (cells) divided by partition walls along the flow direction of exhaust gas, and at both ends of which adjacent through-holes are alternately closed at one end. Exhaust gas which has flown into the DPF through the opening of one through-hole at the inlet side of the honeycomb structure passes a partition wall and is emitted through the opening at the outlet side via the adjacent through-hole. During this process, unburnt carbon is captured by the partition wall.

However, when such a DPF is used, as unburnt carbon is accumulated in the DPF, the pressure loss of the filter increases to have adverse effect on combustion of fuel in an engine, and finally the function of the DPF will be lost. As disclosed in JP-A 08-217565 and JP-A 08-312334, a method has been used in which when the pressure loss of a DPF reaches a predetermined value, rich combustion of fuel is performed to increase the exhaust gas temperature to about 700° C. and thereby unburnt carbon captured is burnt. According to such a method, a DPF can be used while it is reproduced. However, there is a problem that fuel efficiency is decreased because fuel is consumed in order to increase the temperature of DPF when it is reproduced.

In JP-A 2002-004838 and JP-A 2002-058924 proposed is a method in which such a noble metal oxidation catalyst as platinum is arranged in the preceding region of a DPF to produce $NO_2$, thereby promoting combustion of unburnt carbon to lower the reproduction temperature of the filter, or a noble metal oxidation catalyst is supported on a DPF, thereby to similarly lower the reproduction temperature of the filter. It is believed that, in such a method, $NO_x$ is also purified to some extent by hydrocarbons and carbon monoxide contained in exhaust gas in the presence of that catalyst.

It is known that by use of a DPF and a noble metal oxidation catalyst in combination, $NO_x$ in exhaust gas, especially $NO_2$, promotes combustion of unburnt carbon. On the other hand, however, as disclosed in JP-A 01-318715 and APPLIED CATALYSIS: B50 (2004), 185, it has already been known also that $NO_2$ is only reduced to NO after contributing to the oxidation reaction of unburnt carbon and that the oxidation reaction of unburnt carbon has no contribution to reduction of $NO_x$ to nitrogen, namely, reduction in the amount of $NO_x$. Moreover, in the oxidation reaction of unburnt carbon on a noble metal oxidation catalyst such as platinum, oxidation of unburnt carbon proceeds rapidly and unburnt carbon is exhausted promptly. Therefore, even if $NO_x$ is purified, the purification reaction will stop instantly and, therefore, the amount of $NO_x$ purified by unburnt carbon is very small.

On the other hand, in JP-A 09-094434 and WO02/096827, there is proposed a method in which $NO_x$ and unburnt carbon can be removed simultaneously by using a DPF which supports a $NO_x$ occlusion reduction catalyst thereon, thereby occluding $NO_x$ during lean combustion of fuel and purifying $NO_x$ and unburnt carbon during rich combustion of fuel. In such a method, the degree of rich combustion of fuel can be reduced to some extent because unburnt carbon is used for a part of $NO_x$ reduction. It, however, does not fundamentally improve the deterioration of fuel efficiency because it is still necessary to perform rich combustion of fuel.

A catalyst is also proposed for removing $NO_x$ and unburnt carbon simultaneously as mentioned above in JP-A 2006-289175. The catalyst comprises a solid superacid and platinum or the like having high oxidizing ability supported thereon. It, however, seems impossible to purify $NO_x$ over a wide temperature range because combustion of carbon, carbon monoxide and hydrocarbons proceeds rapidly and, as a result, a reducing agent disappears rapidly.

Moreover, a composite oxide having perovskite structure or spinel structure containing a metal having a high perfectly oxidizing ability and a low electronegativity is proposed as a catalyst for removing $NO_x$ and unburnt carbon simultaneously in JP-A 2003-239722 and APPLIED CATALYSIS: B 34 (2004), 29. It, however, seems impossible to purify $NO_x$ over a wide temperature range because this catalyst also has a high perfectly oxidizing ability and, therefore, combustion of carbon, carbon monoxide and hydrocarbons proceeds rapidly and, as a result, a reducing agent disappears rapidly. In addition, this catalyst has a problem that the oxidizing ability and reducing ability thereof will be lost in the presence of sulfur oxides because the catalyst contains a metal having a low electronegativity.

Under these circumstances, a catalyst and a method are awaited which can remove $NO_x$ and unburnt carbon simultaneously under normal lean driving conditions even in the presence of sulfur oxides without needing rich combustion of fuel to reproduce a DPF, which has been performed. Moreover, in order that such a catalyst and method may be applied to diesel engines, it is strongly desired that a reaction to remove $NO_x$ and unburnt carbon simultaneously proceeds over a wide temperature range. The reason for this is that since the exhaust gas temperature of a diesel engine driven under various conditions varies greatly, in order to cause a reaction of simultaneous removal of $NO_x$ and unburnt carbon to proceed and, at the same time, to reproduce a DPF, the reaction must proceed over a wide temperature range.

It is, therefore, an object of the invention to provide a catalyst and a method not only for catalytically reducing $NO_x$ in diesel engine exhaust gas using unburnt carbon contained therein as a reducing agent in a wide temperature range even in the presence of sulfur oxides; at the same time for catalytically removing the unburnt carbon.

DISCLOSURE OF THE INVENTION

The invention provides a catalyst for catalytically reducing nitrogen oxides in diesel engine exhaust gas by use of unburnt carbon contained in the diesel engine exhaust gas as a reducing agent, the catalyst comprising:

(a) an acid zeolite, or (b) an alkali metal- and/or alkaline earth metal-containing zeolite, or (c) a rare earth metal-containing zeolite, or (d) a zeolite containing at least one transition metal selected from Fe, Co, Ni and Cu.

The invention further provides a method for catalytically reducing nitrogen oxides in diesel engine exhaust gas by use of unburnt carbon contained in the diesel engine exhaust gas as a reducing agent, the method comprising bringing diesel engine exhaust gas into contact with a catalyst comprising:

(a) an acid zeolite, or (b) an alkali metal- and/or alkaline earth metal-containing zeolite, or (c) a rare earth metal-containing zeolite, or (d) a zeolite containing at least one transition metal selected from Fe, Co, Ni and Cu.

DETAILED DESCRIPTION OF THE PREFERRED EMBODIMENTS

Zeolites are generally crystalline hydrated aluminosilicates of alkali metal (sodium, potassium, etc.) or alkaline earth metal (magnesium, calcium, etc.) and have a property that the alkali metal or the alkaline earth metal is ion-exchanged relatively easily.

The catalyst according to the invention is a catalyst for catalytically reducing nitrogen oxides in diesel engine exhaust gas by use of unburnt carbon contained in the diesel engine exhaust gas as a reducing agent. The catalyst comprises:

(a) an acid zeolite, or (b) an alkali metal- and/or alkaline earth metal-containing zeolite, or (c) a rare earth metal-containing zeolite, or (d) a zeolite containing at least one transition metal selected from Fe, Co, Ni and Cu.

Since the catalyst of the invention catalytically reduces nitrogen oxides in diesel engine exhaust gas by use of unburnt carbon in the exhaust gas as a reducing agent as mentioned above, the unburnt carbon in the exhaust gas is also catalytically removed simultaneously.

According to the invention, firstly, an alkali metal- and/or alkaline earth metal-containing zeolite including an alkali metal- and/or alkaline earth metal-zeolite is preferably used as a catalyst. The alkali metal- and/or alkaline earth metal-zeolite is a zeolite in which an alkali metal ion and/or an alkaline earth metal ion are (is) contained as a constituent in the crystal structure of the zeolite such that the ion can be ion-exchanged relatively easily. Specific examples thereof include Na-mordenite and Na/Ba-mordenite each having a silica/alumina ratio of from 10 to 20, Na/K-beta zeolite and Na/Ba-beta zeolite each having a silica/alumina ratio of from 20 to 30, Na-ZSM-5 having a silica/alumina ratio of from 20 to 100, K-SUZ-4 having a silica/alumina ratio of from 10 to 20, and Na-ferriorite having a silica/alumina ratio of from 10 to 20.

The alkaline earth metal-containing zeolite can be obtained by ion-exchanging alkali metal ions in an alkali metal-zeolite for alkaline earth metal ions, or by exchanging a part of alkali metal ions used as a silica dissolving agent at the preparation of zeolite for alkaline earth metal ions, thereby causing the alkaline earth metal ions to be contained in the crystal structure of zeolite. The alkali metal- and/or alkaline earth metal-containing zeolite can be obtained also by further carrying alkali metal and/or alkaline earth metal ions on an acid-zeolite described later or the alkali metal-zeolite by known processes such as impregnation and evaporation to dryness.

That is, the alkali metal-containing zeolite includes the aforementioned alkali metal-zeolite, and is an alkali metal-zeolite which further carries alkali metal ions physically in pores thereof. The alkaline earth metal-containing zeolite includes the aforementioned alkaline earth metal-zeolite, and is an alkaline earth metal-zeolite which further carries alkaline earth metal ions physically in pores thereof.

The support ratio of the alkali metal ions and/or alkaline earth metal ions thus supported on a zeolite is preferably 5% or less. When the support ratio of alkali metal ions and/or alkaline earth metal ions is more than 5%, the oxidation-reduction ability of the resultant zeolite catalyst is reduced greatly and, therefore, the catalytic activity for removing $NO_x$ and carbon (C) simultaneously becomes poor.

According to the invention, an alkali metal- and/or alkaline earth metal-metallosilicate resulting from replacement of some or entire portion of aluminum in a zeolite by other metal element(s), especially Fe, Ga, Zn, La, Cu, Mo, Cr, Ge, Ti, Be, etc., can be used as the zeolite in the alkali metal- and/or alkaline earth metal-zeolite. According to the invention, secondly, a rare earth metal-containing zeolite is preferably used as a catalyst, and thirdly, a zeolite containing at least one transition metal selected from Fe, Co, Ni and Cu is preferably used as a catalyst. Examples of the rare earth metal-containing zeolite include metal ion-exchanged zeolites resulting from ion exchange of some or entire portion of the alkali metal ions or alkaline earth metal ions of the alkali metal-zeolite or alkaline earth metal-zeolite for rare earth metal ions. Preferable specific examples of the rare earth metal ions include ions of La, Ce or Pr.

Examples of the zeolite containing at least one transition metal selected from Fe, Co, Ni and Cu include metal ion-exchanged zeolites resulting from ion exchange of some or entire portion of the alkali metal ions or alkaline earth metal ions of the alkali metal-zeolite or alkaline earth metal-zeolite for at least one transition metal ion selected from Fe ion, Co ion, Ni ion and Cu ion.

Further according to the invention, rare earth metal ions may be supported on acid-zeolites described later or alkali metal-zeolites by impregnation or evaporation to dryness. At least one transition metal selected from Fe, Co, Ni, and Cu may also be supported on acid-zeolites or alkali metal-zeolites in a similar manner. Furthermore, both rare earth metals and at least one transition metal selected from Fe, Co, Ni and Cu may be supported on acid-zeolites or alkali metal-zeolites thereby such metal-containing zeolites are obtained.

Thus, herein the invention, the metal-containing zeolite includes a metal ion-exchanged zeolite obtained by ion-exchanging alkali metal ions and alkaline earth metal ions of the alkali metal-zeolite and the alkaline earth metal-zeolite, respectively, for other such metals ions as mentioned above, and in addition, a zeolite obtained by carrying other such metal ions physically on an acid-zeolite or an alkali metal-zeolite.

The support ratio of the rare earth metal ions physically carried on zeolite and/or at least one transition metal ion selected from Fe, Co, Ni and Cu is preferably 5% or less in total. When the support ratio is more than 5%, the resulting zeolite has an enhanced oxidizing ability and, therefore, the selectivity in the reaction of simultaneous removal of $NO_x$ and carbon (C) is reduced.

In particular, it is preferable that the metal ion-exchanged zeolite has metal ions supported thereon by ion-exchange in the range of from 0.5 to 1.5% based on the weight of the metal ion-exchanged zeolite.

A metal ion-exchanged zeolite mentioned above can be obtained, for example, by impregnation. That is, as well-known in the art, a necessary amount of alkali metal-zeolite is added to an aqueous metal salt solution containing necessary metal ions, followed, if necessary, by pH adjustment and, if necessary, heating and stirring.

As the catalyst of the invention, fourthly, an acid-zeolite is also preferably used. Examples of such acid-zeolites include acid-mordenite having a silica/alumina ratio of from 10 to 20, acid-beta zeolite having a silica/alumina ratio of from 20 to 30, acid-ASM-5 having a silica/alumina ratio of from 20 to 100, acid-SUZ-4 having a silica/alumina ratio of from 10 to 20, and acid-ferriorite having a silica/alumina ratio of from 10 to 20.

As well-known in the art, an acid-zeolite can be obtained, for example, by treating the alkali metal-zeolite with an aqueous solution of ammonium salt such as ammonium sulfate or an acid such as sulfuric acid to ion-exchange some or entire portion of the alkali metal ions of the zeolite for ammonium ions or hydrogen ions, followed, if the alkali metal ions have been ion-exchanged for ammonium ions, by calcination at a temperature of about 500° C.

The catalyst of the invention may contain a support such as silica, or inorganic ingredients derived from a binder, if necessary. In this case, it is preferable that the catalyst contains any one of the zeolites (a) to (d) in an amount of at least 75% based on the weight of the catalyst.

The reaction in which nitrogen oxide in diesel engine exhaust gas is catalytically reduced in the presence of the catalyst by using unburnt carbon contained in the diesel engine exhaust gas as a reducing agent and at the same time the unburnt carbon is catalytically removed proceeds as shown by the following formulas:

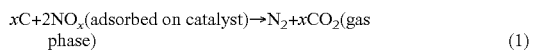

$$xC + 2NO_x(\text{adsorbed on catalyst}) \rightarrow N_2 + xCO_2(\text{gas phase}) \quad (1)$$

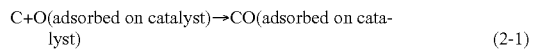

$$C + O(\text{adsorbed on catalyst}) \rightarrow CO(\text{adsorbed on catalyst}) \quad (2\text{-}1)$$

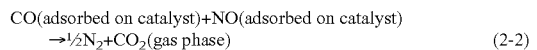

$$CO(\text{adsorbed on catalyst}) + NO(\text{adsorbed on catalyst}) \rightarrow \tfrac{1}{2}N_2 + CO_2(\text{gas phase}) \quad (2\text{-}2)$$

The above reaction, however, is accompanied auxiliary by an oxidation reaction of carbon (C) which has no contribution to the reduction of $NO_x$ as shown by the following formulas:

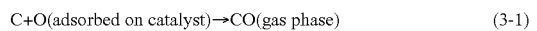

$$C + O(\text{adsorbed on catalyst}) \rightarrow CO(\text{gas phase}) \quad (3\text{-}1)$$

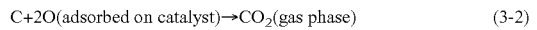

$$C + 2O(\text{adsorbed on catalyst}) \rightarrow CO_2(\text{gas phase}) \quad (3\text{-}2)$$

As a result, the selective reactivity of the reactions (1) and (2) above mentioned are reduced.

Catalytic diesel particulate filters using $NO_x$ occlusion catalysts which have heretofore been proposed are catalysts not for selectively promoting the reaction (1) and the reactions (2-1) and (2-2), but for the reactions (3-1) and (3-2). Moreover, such catalytic diesel particulate filters are not able to purify $NO_x$ by use of unburnt carbon in a wide temperature range because the temperature range where unburnt carbon can be burnt is narrow. Composite oxide catalysts having perovskite or spinel structure for simultaneous removal of unburnt carbon and $NO_x$ which have been heretofore proposed have a serious problem in practical use that the temperature range where unburnt carbon and $NO_x$ can be removed simultaneously is narrow because the catalysts have high oxidizing abilities and therefore they burn unburnt carbon rapidly.

However, the use of the catalyst of the invention makes it possible not only to catalytically reduce nitrogen oxides in diesel engine exhaust gas by using the unburnt carbon contained in the diesel engine exhaust gas as a reducing agent even in the presence of sulfur oxides because the catalyst causes the reaction shown by the formulas (1), (2-1) and (2-2) to proceed selectively; at the same time to remove unburnt carbon.

The reaction temperature suitable for catalytically reducing nitrogen oxides in diesel engine exhaust gas by use of unburnt carbon contained in the diesel engine exhaust gas as a reducing agent by bringing the diesel engine exhaust gas into contact with the catalyst of the invention, which depends not only upon the composition of individual diesel engine exhaust gas but also upon the physical and chemical properties of unburnt carbon, is typically within the range of from 350 to 600° C., and preferably within the range of from 400 to 550° C. In such reaction temperature ranges, exhaust gas is preferably treated at a space velocity within the range of from 5,000 to 100,000 $h^{-1}$.

According to the invention, nitrogen oxides in diesel engine exhaust gas can be catalytically reduced by using harmful unburnt carbon contained in the diesel engine exhaust gas as a reducing agent, and at the same time the unburnt carbon can be catalytically removed, in a wide temperature range even in the presence of sulfur oxides. In particular, the catalyst of the invention is useful for simultaneous catalytic removal of $NO_x$ and unburnt carbon in diesel engine exhaust gas the temperature of which varies greatly, because the catalyst can catalytically remove $NO_x$ and unburnt carbon in exhaust gas simultaneously in a wide temperature range.

In other words, the use of the catalyst of the invention makes it possible to purify $NO_x$ without accumulation of unburnt carbon in a DPF and without needing to perform rich combustion of fuel, which will lead to decrease in fuel efficiency, as in DPFs supporting $NO_x$ occlusion catalysts. Furthermore, the use of the catalyst of the invention makes it possible to catalytically remove $NO_x$ and unburnt carbon in diesel engine exhaust gas simultaneously and effectively without being accompanied by catalyst degradation in the presence of sulfur oxides as in complex oxides having perovskite or spinel structure.

Therefore, a catalytic DPF (i.e., CDPF) prepared by supporting the catalyst of the invention on a DPF makes it possible to purify diesel engine exhaust gas in a practical manner.

EXAMPLES

The invention is described in more detail below with reference to Examples, but the invention is not limited thereto. Hereinafter, all "part" and "%" are on weight basis unless otherwise specified.

By use of carbon black instead of unburnt carbon, a purification reaction of $NO_x$ using carbon black as a reducing agent was conducted in the following two procedures.

(1) Purification Reaction of Exhaust Gas Using a Temperature Raising Reaction 0.1 g of a catalyst and 0.1 g of carbon black (#7350F produced by Tokai Carbon Co., Ltd., average particle diameter=28 nm, specific surface area=80 m²/g) were placed in a 20-mL sample tube, followed by 50-stroke shaking, thereby preparing a catalyst/carbon black mixture. A SUS 104 mesh having an opening of 0.71 mm was placed on projects on the inner wall of a perpendicularly-arranged reaction tube made of quartz. Ceramic fiber was spread in a thickness of about 1 mm on the mesh and the catalyst/carbon mixture was placed on the fiber. Ceramic fiber was then spread in a thickness of about 1 mm on the mixture in order to prevent the mixture from scattering.

The temperature of the mixture was raised from 30° C. to 700° C. at a rate of 5° C./min while exhaust gas for test composed of 500 ppm of nitrogen monoxide (NO), 9% of oxygen, 3% of water, 500 ppm of hydrogen, 5 ppm of sulfur dioxide ($SO_2$) and the remainder helium was fed at a rate for 834 mL/min into the quartz reaction tube from the entrance thereof. The composition of the gas emitted from an outlet of the quartz reaction tube was then analyzed about nitrogen monoxide (NO), dinitrogen oxide ($N_2O$), nitrogen dioxide ($NO_2$), carbon monoxide (CO) and carbon dioxide ($CO_2$) with an FTIR gas analyzer (Gasmet CR-2000L produced by Temet). The gas composition analysis was started when the temperature of the mixture was at 100° C.

A temperature range between a temperature at which the concentration of carbon dioxide ($CO_2$) in the outlet gas determined by the gas analyzer exceeds 0.1% and a temperature at which the concentration becomes lower than 0.1% is defined as a temperature range of carbon dioxide ($CO_2$) generation, that is, a temperature range of carbon black combustion. The amount of $NO_x$ purified, which may vary depending upon the catalyst used, was calculated using the following formula for the temperature range of carbon black combustion:

Amount(cc) of $NO_x$ purified=$abd/c$

In this formula, a represents (average concentration (ppm) of purified $NO_x$ in a temperature range of carbon black combustion)×$10^{-6}$, that is, ($NO_x$ concentration at the reaction tube inlet−average $NO_x$ concentration at the reaction tube outlet in the temperature range of carbon black combustion (ppm))×$10^{-6}$; b represents a temperature range (° C.) of carbon black combustion; c represents a temperature raising rate (5° C./min); and d represents a gas flow rate (834 cc/min).

The combustion ratio (%) of C (carbon) was calculated using the following formula:

Combustion ratio(%) of C(carbon)=$ab/c$

In this formula, a represents (average CO concentration (%)+average $CO_2$ concentration (%))/100 in a temperature range where $CO_2$ was generated in a purification reaction; and b represents the total amount of gas flow in the temperature range of carbon black combustion. That is, b is represented using a formula: temperature range of carbon black combustion (° C.)/temperature raising rate (5° C./min)×amount of gas flow (834 cc/min).

c represents the amount of carbon used in the purification reaction (on gas basis), that is, (0.1 g (amount of carbon used in the purification reaction test (on weight basis)/12 g)×22400 cc.

(2) Purification Reaction of Exhaust Gas Using an Isothermal Reaction 0.4 g of a catalyst and 0.1 g of the same carbon black as that mentioned above were lightly mixed using an agate mortar to prepare a catalyst/carbon black mixture. A SUS 104 mesh having an opening of 0.71 mm was placed on projects on the inner wall of a perpendicularly-arranged reaction tube made of quartz. Ceramic fiber was spread in a thickness of about 1 mm on the mesh and the catalyst/carbon mixture was placed on the fiber. Ceramic fiber was then spread in a thickness of about 1 mm on the mixture in order to prevent the mixture from scattering.

The temperature of the mixture was increased to a predetermined temperature with helium gas being supplied into the quartz reaction tube at a rate of 500 mL/min from the inlet thereof. After arrival at a constant temperature, exhaust gas for test with the same composition as that mentioned hereinbefore was supplied into the quartz reaction tube at a rate of 834 mL/min from the inlet thereof, and simultaneously, the composition of gas emitted from the outlet of the quartz reaction tube was analyzed in the same manner as mentioned hereinbefore. The purification reaction of $NO_x$ was performed for 15 minutes. The $NO_x$ purification percentage during the 15-minute isothermal reaction was determined on the basis of the $NO_x$ determined in a blank test.

Example 1

Potassium-zeolite (K-SUZ-4 produced by Nippon Chemical Industrial Co., Ltd., silica/alumina ratio=12.4, potassium content=1.5%) was ground for one minute with an agate mortar. Using the resultant ground powder, purification reaction tests of exhaust gas using a temperature raising reaction and an isothermal reaction were conducted.

Example 2

To 100 mL of ion exchange water containing 0.37 g of ferric nitrate ($Fe(NO_3)_3 \cdot 9H_2O$) dissolved, 5 g of potassium-zeolite as the same as that of Example 1 was added, followed by ion exchange reaction at 70° C. for 12 hours under stirring. The resultant was filtered, washed with water, and then dried at 100° C. for 12 hours. The dried product was calcined at 500° C. for one hour in the air to yield 1% by weight Fe ion-exchanged SUZ-4, which was then ground for one minute with an agate mortar. Using the resultant ground powder, purification reaction tests of exhaust gas using a temperature raising reaction and an isothermal reaction were conducted.

Example 3

To 200 mL of ion exchange water containing 0.18 g of barium nitrate ($Ba(NO_3)_3$) dissolved, 10 g of potassium-zeolite as the same as that of Example 1 was added, followed by ion exchange reaction at 70° C. for 12 hours under stirring. The resultant was filtered, washed with water, and then dried at 100° C. for 12 hours. The dried product was calcined at 500° C. for one hour in the air to yield 1% by weight Ba-SUZ-4, which was then ground for one minute with an agate mortar. Using the resultant ground powder, a purification reaction test of exhaust gas using a temperature raising reaction was conducted.

Example 4

To 200 mL of ion exchange water containing 0.38 g of copper nitrate ($Cu(NO_3)_3 \cdot 3H_2O$) dissolved, 10 g of $NH_4$-mordenite (CBV-21A produced by Zeolist, silica/alumina ratio=20, Na content=0.08%) was added, followed by ion exchange reaction at 70° C. for 12 hours under stirring. The resultant was filtered, washed with water, and then dried at 100° C. for 12 hours. The dried product was calcined at 500° C. for one hour in the air to yield 1% by weight Cu ion-exchanged mordenite, which was then ground for one minute with an agate mortar. Using the resultant ground powder, a purification reaction test of exhaust gas using a temperature raising reaction was conducted.

Example 5

To 200 mL of ion exchange water containing 0.50 g of nickel nitrate ($Ni(NO_3)_3 \cdot 6H_2O$) dissolved, 10 g of $NH_4$-mordenite as the same as that of Example 4 was added, followed by ion exchange reaction at 70° C. for 12 hours under stirring. The resultant was filtered, washed with water, and then dried at 100° C. for 12 hours. The dried product was calcined at 500° C. for one hour in the air to yield 1% by weight Ni ion-exchanged mordenite, which was then ground for one minute with an agate mortar. Using the resultant ground powder, a purification reaction test of exhaust gas using a temperature raising reaction was conducted.

Example 6

To 200 mL of ion exchange water containing 0.49 g of cobalt nitrate ($Co(NO_3)_3 \cdot 6H_2O$) dissolved, 10 g of $NH_4$-mordenite as the same as that of Example 4 was added, followed by ion exchange reaction at 70° C. for 12 hours under stirring. The resultant was filtered, washed with water, and then dried at 100° C. for 12 hours. The dried product was calcined at 500° C. for one hour in the air to yield 1% by weight Co ion-exchanged mordenite, which was then ground for one minute with an agate mortar. Using the resultant ground powder, a purification reaction test of exhaust gas using a temperature raising reaction was conducted.

Example 7

To 200 mL of ion exchange water containing 0.31 g of lanthanum nitrate ($La(NO_3)_3 \cdot 6H_2O$) dissolved, 10 g of $NH_4$-mordenite as the same as that of Example 4 was added, followed by ion exchange reaction at 70° C. for 12 hours under stirring. The resultant was filtered, washed with water, and then dried at 100° C. for 12 hours. The dried product was calcined at 500° C. for one hour in the air to yield 1% by weight La ion-exchanged mordenite, which was then ground for one minute with an agate mortar. Using the resultant ground powder, a purification reaction test of exhaust gas using a temperature raising reaction was conducted.

Example 8

Na-mordenite (HSZ-642NNA produced by Tosoh Corporation, silica/alumina ratio=18, Na content=5.0%) was ground for one minute with an agate mortar. Using the resultant ground powder, purification reaction tests of exhaust gas using a temperature raising reaction and an isothermal reaction were conducted.

Example 9

To 200 mL of ion exchange water containing 0.31 g of cerium nitrate ($Ce(NO_3)_3 \cdot 6H_2O$) dissolved, 10 g of Na-mordenite as the same as that of Example 8 was added, followed by ion exchange reaction at 70° C. for 12 hours under stirring. The resultant was filtered, washed with water, and then dried at 100° C. for 12 hours. The dried product was calcined at 500° C. for one hour in the air to yield 1% by weight Ce ion-exchanged mordenite, which was then ground for one minute with an agate mortar. Using the resultant ground powder, a purification reaction test of exhaust gas using a temperature raising reaction was conducted.

Example 10

$NH_4$-beta zeolite (BEA-25 produced by Sud-Chemie AG, silica/alumina ratio=25, Na content=0.1%) was ground for one minute with an agate mortar. Using the resultant ground powder, a purification reaction test of exhaust gas using a temperature raising reaction was conducted. $NH_4$-beta zeolite is converted into acid-beta zeolite under reaction conditions.

Example 11

To 200 mL of ion exchange water containing 3.10 g of cerium nitrate ($Ce(NO_3)_3 \cdot 6H_2O$) dissolved, 10 g of Na-mordenite as the same as that of Example 8 was added, followed by evaporation to dryness at 70° C. under stirring to yield 10% by weight Ce ion-exchanged mordenite. This was ground for one minute with an agate mortar. Using the resultant ground powder, a purification reaction test of exhaust gas using an isothermal reaction was conducted.

Referential Example 1

To 200 mL of ion exchange water, 1.00 g of aqueous palladium nitrate solution (palladium content=5% by weight) was added. Then, 5 g of $NH_4$-beta zeolite as the same as that of Example 10 was added thereto, followed by ion exchange reaction at 70° C. for 12 hours under stirring. The resultant was filtered, washed with water, and then dried at 100° C. for 12 hours. The dried product was calcined at 500° C. for one hour in the air to yield 1% by weight Pd ion-exchanged beta zeolite, which was then ground for one minute with an agate mortar. Using the resultant ground powder, purification reaction tests of exhaust gas using a temperature raising reaction and an isothermal reaction were conducted.

For each of the catalysts obtained in Examples 1 to 10 and Referential Example 1, the result of the purification reaction of exhaust gas using a temperature raising reaction is shown in Table 1. For each of the catalysts obtained in Examples 1, 2, 8 and 11 and Referential Example 1, the result of the purification reaction of exhaust gas using an isothermal reaction is shown in Table 2.

TABLE 1

| | Temperature Span of $CO_2$ Generation/ $CO_2$ Generation Temperature Range (C°) | Combustion Rate of C in $CO_2$ Generation Temperature Range (%) | Amount of NOx Purified in $CO_2$ Generation Temperature Range (cc) |
|---|---|---|---|
| Example 1 | 180.0/467.4-647.4 | 91.3 | 2.79 |
| Example 2 | 225.7/454.3-680.0 | 76.4 | 3.54 |
| Example 3 | 211.8/447.5-659.3 | 78.5 | 2.96 |
| Example 4 | 302.0/398.0-700.0 | 80.6 | 2.48 |
| Example 5 | 142.4/488.1-630.5 | 81.8 | 2.19 |
| Example 6 | 125.3/510.3-635.6 | 76.4 | 1.98 |
| Example 7 | 153.5/493.2-646.7 | 68.2 | 2.46 |
| Example 8 | 252.1/447.9-700.0 | 77.1 | 3.11 |
| Example 9 | 298.9/398.8-697.7 | 77.9 | 3.12 |
| Example 10 | 224.4/416.1-640.5 | 79.6 | 2.64 |
| Referential Example 1 | 117.2/450.5-567.7 | 91.5 | 1.14 |

TABLE 2

| | Reaction Temperature (° C.) | NOx Purifcation Rate (%) |
|---|---|---|
| Example 1 | 480 | 33.4 |
| | 510 | 50.1 |
| Example 2 | 450 | 30.0 |
| | 470 | 52.3 |
| Example 8 | 490 | 39.9 |
| | 510 | 55.9 |
| Example 11 | 460 | 24.5 |
| Referential Example 1 | 460 | 13.8 |

The invention claimed is:

1. A catalytic diesel particulate filter which comprises a diesel particulate filter and a catalyst supported thereon, wherein the catalyst comprises:
    (a) a barium-containing zeolite, or
    (b) a rare earth metal-containing zeolite, or
    (c) a zeolite containing at least one transition metal selected from Fe, Co, Ni and Cu.

2. The catalytic diesel particulate filter according to claim 1, wherein the rare earth metal-containing zeolite is a zeolite containing at least one rare earth metal selected from La, Ce, and Pr.

3. The catalytic diesel particulate filter according to claim 1, wherein the zeolite containing at least one transition metal is a zeolite containing at least one rare earth metal selected from La, Ce, and Pr.

4. A method for catalytically reducing nitrogen oxides in diesel engine exhaust gas by use of unburnt carbon contained in the diesel engine exhaust gas as a reducing agent using a diesel particulate filter wherein the method comprises bringing the diesel engine exhaust gas into contact with a catalyst supported on the diesel particulate filter, the catalyst comprising:
    (a) a barium-containing zeolite, or
    (b) a rare earth metal-containing zeolite, or
    (c) a zeolite containing at least one transition metal selected from Fe, Co, Ni and Cu.

5. The method according to claim 4 wherein the rare earth metal-containing zeolite is a zeolite containing at least one rare earth metal selected from La, Ce and Pr.

6. The method according to claim 4, wherein the zeolite containing at least one transition metal is a zeolite containing at least one rare earth metal selected from La, Ce, and Pr.

* * * * *